United States Patent
Muramatsu

(10) Patent No.: US 9,755,569 B2
(45) Date of Patent: Sep. 5, 2017

(54) MOTOR CONTROL APPARATUS

(71) Applicant: DENSO CORPORATION, Kariya, Aichi-pref. (JP)

(72) Inventor: Rei Muramatsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/092,339

(22) Filed: Apr. 6, 2016

(65) Prior Publication Data

US 2016/0301350 A1 Oct. 13, 2016

(30) Foreign Application Priority Data

Apr. 9, 2015 (JP) .................................. 2015-80265

(51) Int. Cl.
| | | |
|---|---|---|
| *H02P 29/00* | (2016.01) | |
| *H02P 29/024* | (2016.01) | |
| *H02P 1/22* | (2006.01) | |

(52) U.S. Cl.
CPC .......... *H02P 29/027* (2013.01); *H02P 29/024* (2013.01); *H02P 1/22* (2013.01)

(58) Field of Classification Search
CPC ..................................................... H02P 29/00
USPC .......................... 318/294, 293, 291, 287, 280
See application file for complete search history.

(56) References Cited

U.S. PATENT DOCUMENTS 6,118,239 A * 9/2000 Kadah .................... H02P 25/04
318/268

FOREIGN PATENT DOCUMENTS

| JP | H10-70897 A | 3/1998 |
| JP | 2004-194418 A | 7/2004 |
| JP | 2008-49780 A | 3/2008 |
| JP | 2010-47096 A | 3/2010 |

* cited by examiner

*Primary Examiner* — David S Luo
(74) *Attorney, Agent, or Firm* — Knobbe, Martens, Olson & Bear, LLP

(57) ABSTRACT

A motor control apparatus controlling current feeding and a rotational direction of a motor includes: four bridge-circuit switches between a high and low potential lines; two current feeding line switches connected through the motor between a first and second nodes in series to arrange two parasitic diodes facing each other; a pull-up resistor between the high potential line and a third node; a pull-down resistor between the low potential line and a fourth node to interpose the motor between the third and fourth nodes; a protective diode blocking current; and a fault diagnostic device having: a driver turning on or off the switches; and a voltage determinator determining suitability of a first and second voltages and performing initial fault diagnosis for at least one of the switches.

6 Claims, 11 Drawing Sheets

MOTOR CONTROL APPARATUS

CROSS REFERENCE TO RELATED APPLICATIONS

This application is based on Japanese Patent Application No. 2015-80265 filed on Apr. 9, 2015, the disclosure of which is incorporated herein by reference.

TECHNICAL FIELD

The present disclosure relates to a motor control apparatus that controls a current feed to a motor and the rotational direction of the motor.

BACKGROUND

It has been recently known that motor control apparatuses control a current feed to a motor and the rotational direction of the motor by operating switches in an H-bridge circuit. For example, the Patent Document 1 discloses a control apparatus for controlling a DC motor to be used in an electric power steering apparatus in that two semiconductor switching elements are connected in series at a current feeding line such that parasitic diodes face opposite to each other The Patent Document 1 discloses an initial fault diagnostic sequence to be executed after an ignition power source is turned on. With regard to the fault diagnosis, when a short-circuit fault is diagnosed in a current feeding line switch, upper arm switches in the H-bridge circuit are turned on one by one to determines a detection voltage for each of two current feeding line switches. With regard to the fault diagnosis, when lower arm switches constituting a pair have a short-circuit fault, a high potential line and a low potential line are connected in a short circuit at the time of turning on the upper arm switches, and hence an overcurrent flows to cause a damage on the switches.

Additionally, at the time of determining the detection voltage, it is necessary for the initial fault diagnostic sequence to wait until the voltage gets stable after turning on or off switches. With regard to the prior art described in the Patent Document 1, it is necessary to determine the detection voltage twice for the current feeding line switches one by one with only the short-circuit fault diagnosis on the current feeding line switches. Hence, it will take longer time to carry out the fault diagnosis.

[Patent Document 1] Japanese Unexamined Patent Application Publication No. 2010-47096

SUMMARY

It is an object of the present disclosure to provide a motor control apparatus that prevents an overcurrent flows through a bridge circuit when having a short-circuit fault diagnosis on a current feeding line switch.

According to an aspect in the present disclosure, a motor control apparatus controls current feeding to a motor and a rotational direction of the motor by operating a switch in an H-bridge circuit. The motor control apparatus includes: four bridge-circuit switches that are arranged between a high potential line and a low potential line, and constitute the H-bridge circuit in which a first half-bridge circuit and a second half-bridge circuit are connected in parallel; two current feeding line switches that are arranged at a current feeding line connected via the motor between a first node as an intermediate point of the first half-bridge circuit and a second node as an intermediate point of the second half-bridge circuit, and that are connected in series so as to arrange two parasitic diodes facing each other in the two current feeding line switches; a pull-up resistor that is connected between the high potential line and a third node, which is arranged between the two current feeding line switches on the current feeding line; a pull-down resistor that is connected between the low potential line and a fourth node, which is arranged at an opposite side of the third node such that the motor is interposed between the third node and the fourth node on the current feeding line; a protective diode that is connected to at least one of the pull-up resistor and the pull-down resistor, and blocks a current flowing from a low potential side to a high potential side; and a fault diagnostic device that has: a driving circuit that turns on or off the four bridge-circuit switches and the two current feeding line switches; and a voltage determinator that determines suitability of a first voltage at the first node and a second voltage at the second node. In addition, the fault diagnostic device carries out initial fault diagnosis for at least one of the four bridge circuit switches and the two current feeding line switches based on the first voltage and the second voltage before driving of the motor.

In the motor control apparatus of the present disclosure, the protective diode is connected to at least one of the pull-up resistor and the pull-down resistor. Therefore, it is prevented that the regenerative current generated by the motor flows into the high potential line. Accordingly, in the configuration of using the voltage at the high potential line as the control voltage of the control circuit, it is prevented from having an error operation in the control circuit or damage to the control circuit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
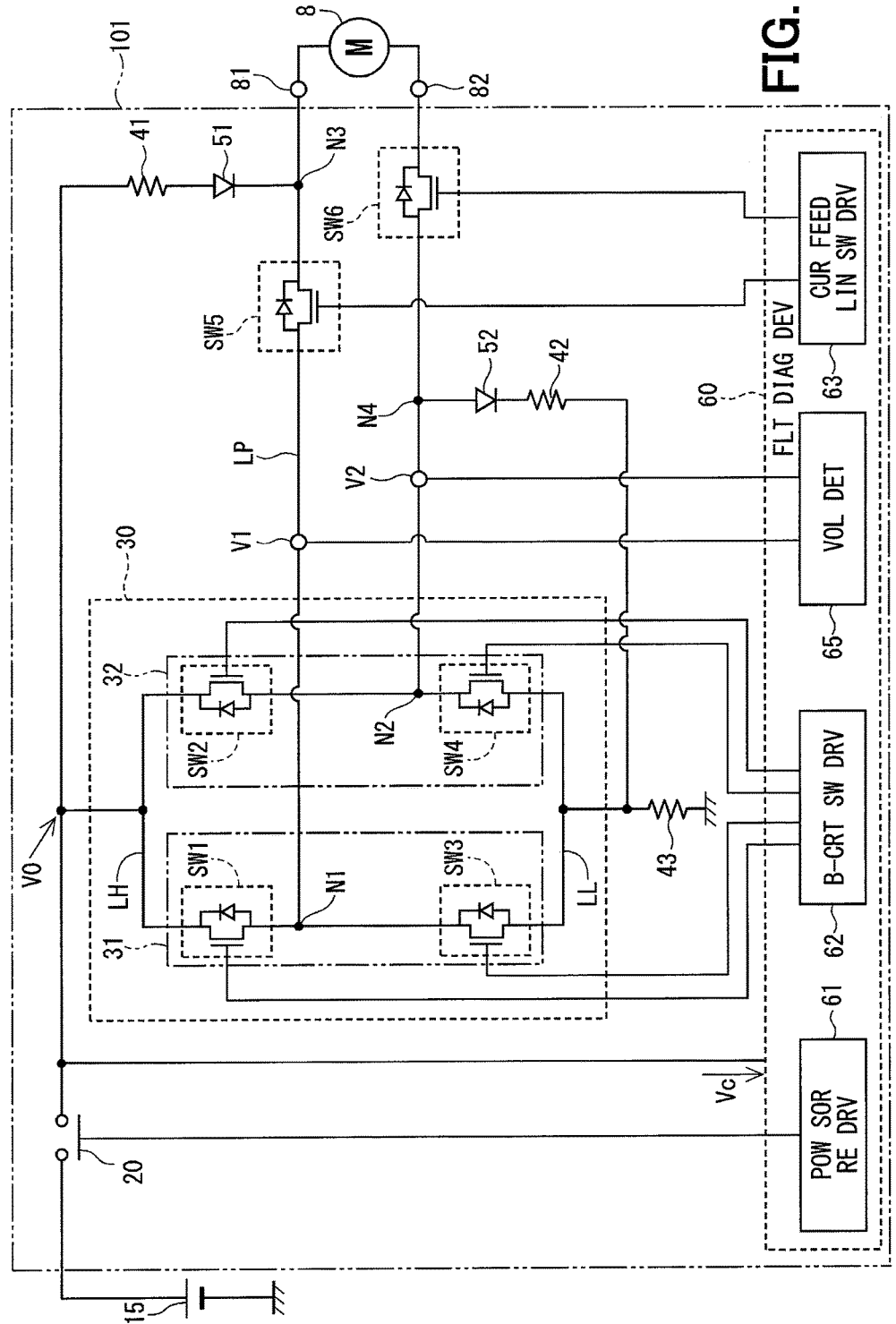
FIG. 1 is a diagram that shows the overall configuration of a motor control apparatus according to a first embodiment in the present disclosure.

The following describes a plurality of embodiments with regard to motor control apparatuses in the present disclosures based on the drawings. It is noted that the identical configuration appended by the identical reference numerals in the plurality of embodiments are not repeatedly described. In the following description, the term "present embodiment" includes a first embodiment to a fourth embodiment.

First Embodiment

Initially, the overall configuration of the motor control apparatus is described with reference to FIG. 1.

A motor control apparatus 101 is arranged between a battery 15 and a motor 8, and controls the current feeding to the motor 8 and the rotational direction of the motor 8. The motor 8 according to the present embodiment is a DC motor used as an assistive motor for assisting a driver's steering that is arranged in a vehicular electric power steering apparatus. The motor 8 rotates in a clockwise direction when, for example, the handle is turned in a right direction; and the motor 8 rotates in a counter-clockwise direction when, for example, the handle is turned in a left direction. In addition, when the motor 8 is rotated by external force from a road surface, the motor 8 operates as a power generator that generates a current in a regenerative direction.

The motor control apparatus 101 includes, for example, a power source relay 20, four bridge circuit switches SW1, SW2, SW3, SW4 for constituting an H-bridge circuit 30, two current feeding line switches SW5 and SW6, a pull-up resistor 41, a pull-down resistor 42, protective diodes 51, 52 and a fault diagnostic device 60. The power source relay 20 supplies or blocks a power source voltage VO of the battery 15 to the H-bridge circuit 30. With regard to the present embodiment, the power source relay 20 is turned on when the driver turns on the power source of the ignition.

In the following description, the term "switch" in the present specification means a semiconductor switching element. In the present embodiment, a MOSFET (Metal-Oxide-Semiconductor Field Effect Transistor) having a parasitic diode is used as a switch. The switch is noted as "SW" in FIG. 1.

Four bridge circuit switches SW1, SW2, SW3 and SW4, which are arranged between the high potential line LH and the low potential line LL, constitutes the H-bridge circuit 30 in which a first half-bridge circuit 31 and a second half-bridge circuit 32 are connected in parallel. The switch SW1 is an upper arm switch in the first half-bridge circuit 31; and the switch SW3 is a lower arm switch in the second half-bridge circuit 31. In addition, the switch SW2 is an upper arm switch in the second half-bridge circuit 32; and the switch SW4 is a lower arm switch in the second half-bridge circuit 32.

When the power source relay 20 is turned on, the power source voltage VO is applied to the high potential line LH in the H-bridge circuit 30. The low potential line LL in the H-bridge circuit 30 is connected to a ground through a shunt resistor 43 for current detection. It is noted that the present disclosure may not have the shunt resistor 43 or may have another current sensor for the current feeding line LP from the H-bridge circuit 30 to the motor 8.

A first node N1 as the intermediate point of the first half-bridge circuit 31 is connected to a motor terminal at one side of the motor 8; and a second node N2 as the intermediate point of the second half-bridge circuit 32 is connected to a motor terminal 82 at the other side of the motor 8. The current feeding line LP is a current path connected between the first node N1 and the second node N2 through the motor 8.

Two current feeding line switches SW5 and SW6, which are arranged at the current feeding line LP, are connected in series such that the parasitic diodes face to each other. In the first embodiment, two current feeding line switches SW5 and SW6 are arranged such that the motor 8 is held between the two current feeding line switches SW5 and SW6.

For simplicity, the description related to, for example, PWM control or dead time is omitted. The bridge circuit switches SW1 and SW4 are turned on when the motor rotates in the clockwise direction. In addition, the current feeding line switch SW6 is turned on when the current feeding line switch SW5 is turned off. Accordingly, the current flows in a path from the switch SW1, the first node N1, the parasitic diode in the switch SW5, the motor 8, the switch SW6, the second node N2 to the switch SW4. In this situation, the current flowing in a reverse direction (i.e., from the second node N2 to the first node N1) at the current feeding line LP is blocked by the parasitic diode in the current feeding line switch SW5.

The bridge circuit switches SW2 and SW3 are turned on when the motor rotates in the counter-clockwise direction. In addition, the current feeding line switch SW5 is turned on, and the current feeding line switch SW6 is turned off. Therefore, the current flows in the path from the switch SW2, the second node N2, the parasitic diode in the switch SW6, the motor 8, the switch SW5, the first node N1 to the switch SW3. In this situation, the current flowing in the reverse direction (from the first node N1 to the second node N2) at the current feeding line LP is blocked by the parasitic diode in the current feeding line switch SW6.

The current flowing in a direction opposite to the original direction is prevented from flowing into the motor 8 by switching the current feeding line switches SW5 and SW6 to turn on or off in response to the rotational direction of the motor 8.

The pull-up resistor 41 is connected between the high potential line LH and a third node N3, which is located between both of the current feeding line switches SW5 and SW6 on the current feeding line LP.

The pull-down resistor 42 is connected between the low potential line LL and a fourth node N4 at a side opposite to the third node N3 so as to hold the motor 8 on the current feeding line LP.

In the first embodiment, the protective diodes 51, 52 are connected in series with the pull-up resistor 41 and the pull-down resistor 42, respectively. The order in the series connection between pull-up resistor 41 and the protective diode 51 and between the pull-down resistor 42 and the protective diode 52 may be made in reverse as opposed to the order illustrated in the drawing.

In the following description, the protective diode 51 connected to the pull-up resistor 41 may be described as the upper-side protective diode; and the protective diode 52 connected to the pull-down resistor 42 may be described as the lower-side protective diode. The protective diodes 51, 52 enables a current directed from the high potential side to the low potential side, and blocks a current directed from the low potential side to the high potential side. The regenerative current generated at the time of power generation of the motor 8 is assumed as the current directed from the low potential side to the high potential side.

The fault diagnostic device 60 operates the H-bridge circuit at the time of ordinarily driving the motor 8, and is arranged as one part of the control circuit that controls the current feeding to the motor 8 and the rotational direction of the motor 8. With regard to the control at the time of ordinarily driving the DC motor, since it is well-known as described in, for example, Patent Document 1, the detailed description and the illustration of input and output signals relevant to the well-known art are omitted. In the present disclosure, the fault diagnostic device 60 is referred to as the control circuit.

The fault diagnostic device 60 includes: a power source relay driver 61 that turns on or off the power source relay 20; a bridge circuit switch driver 62 that turns on or off the bridge circuit switches SW1, SW2, SW3, SW4; and a current feeding line switch driver 63 that turns on or off the current feeding line switches SW5, SW6.

The fault diagnostic device 60 further includes a voltage determining device 65 that obtains a first voltage V1 as the potential at the first node N1 and a second voltage V2 as the potential at the second node N2; and determines whether it is suitable or not. It is noted that the illustration such as voltage dividing resistance is omitted.

The fault diagnostic device 60 performs the initial fault diagnosis for the bridge circuit switches SW1, SW2, SW3 and SW4 and the current feeding line switches SW5 and SW6 prior to the start of driving the motor 8 after the power source of the ignition is turned on. The detail of the initial fault diagnosis is described later.

In addition, the voltage after the power source relay 20 is inputted as the control voltage Vc of the fault diagnostic device 60. Accordingly, when it is assumed that the voltage at the high potential line LH gets excessively larger, the operation of the fault diagnostic device 60 is affected by this situation and hence an error operation appears in the operation of the control circuit in a state of having ordinary driving. Therefore, it is possible that the circuit gets damage.

With regard to the first feature of the motor control apparatus 101 in the present disclosure, it is prevented that the regenerative current generated by the motor 8 flows to the high potential line LH and the voltage after the power source relay 20 used as the control voltage Vc. With regard to the configuration for achieving this feature, in the motor control apparatus 101, the protective diodes 51, 52 are connected to the pull-up resistor 41 and the pull-down resistor 42, respectively.

Figure 2:
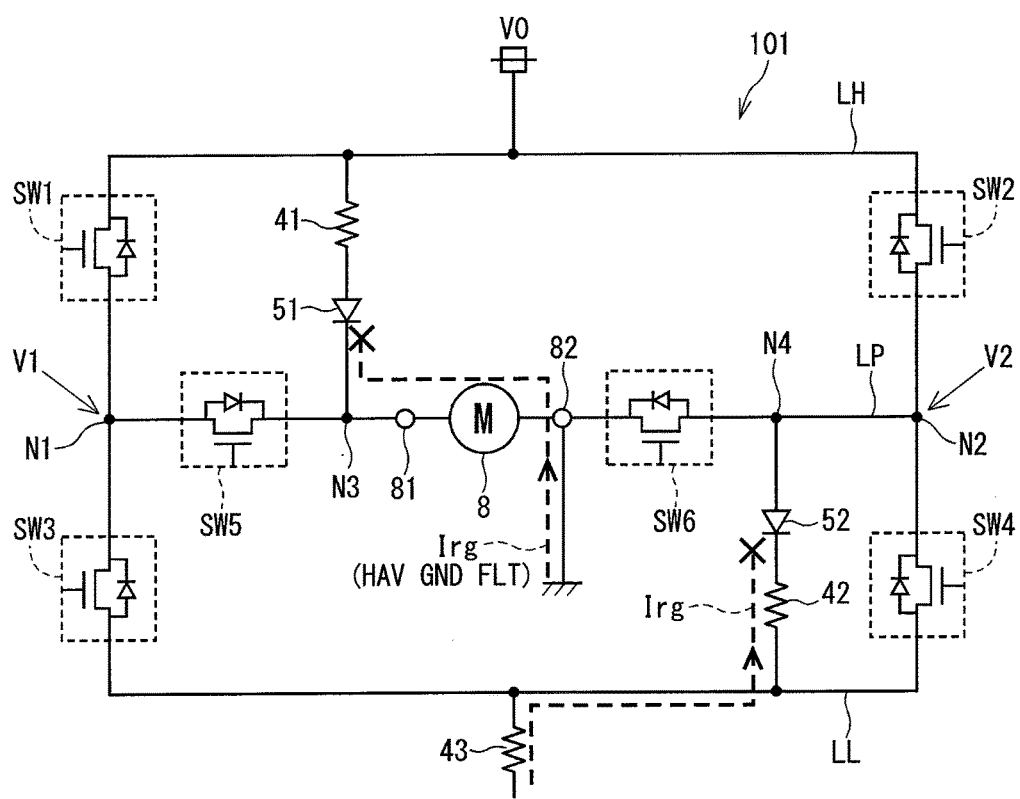
FIG. 2 is a diagram that shows a current feeding circuit for the motor control apparatus according to the first embodiment in the present disclosure.
Figure 10:
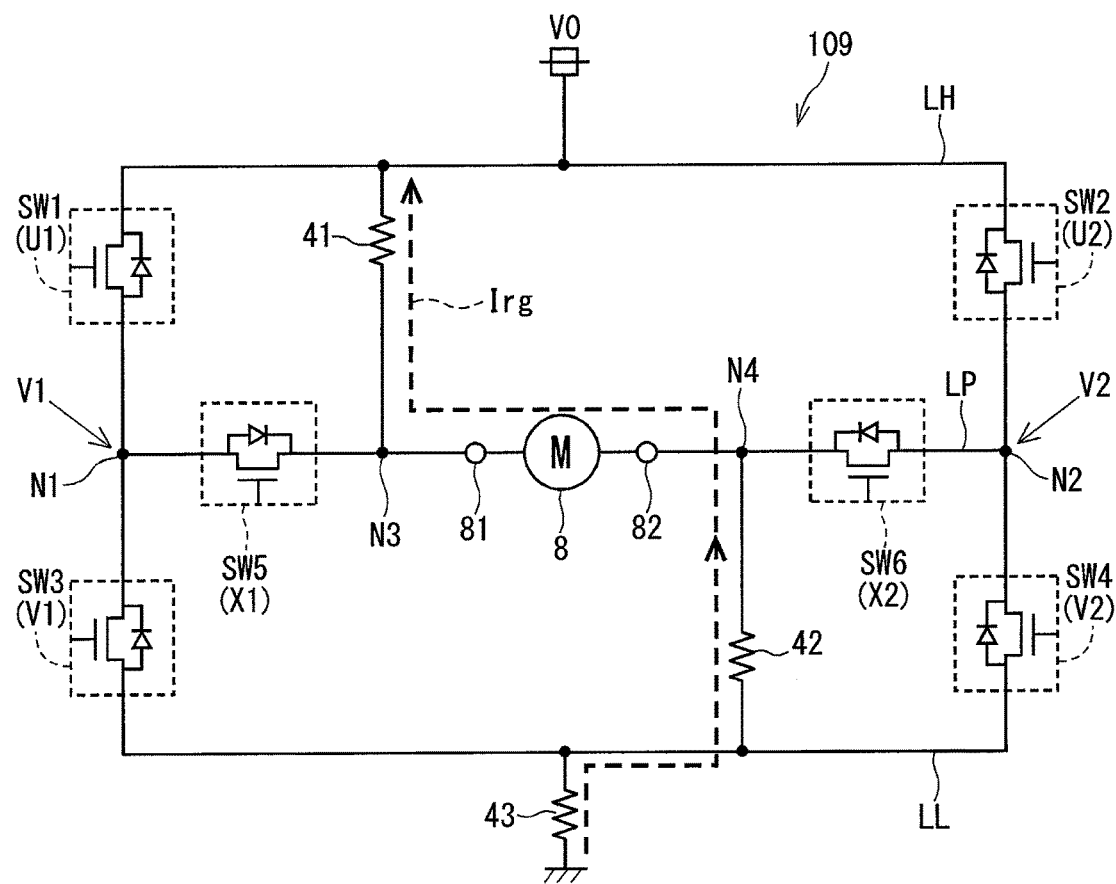
FIG. 10 is a diagram that shows a current feeding circuit for a motor control apparatus according to a first prior art.
Figure 11:
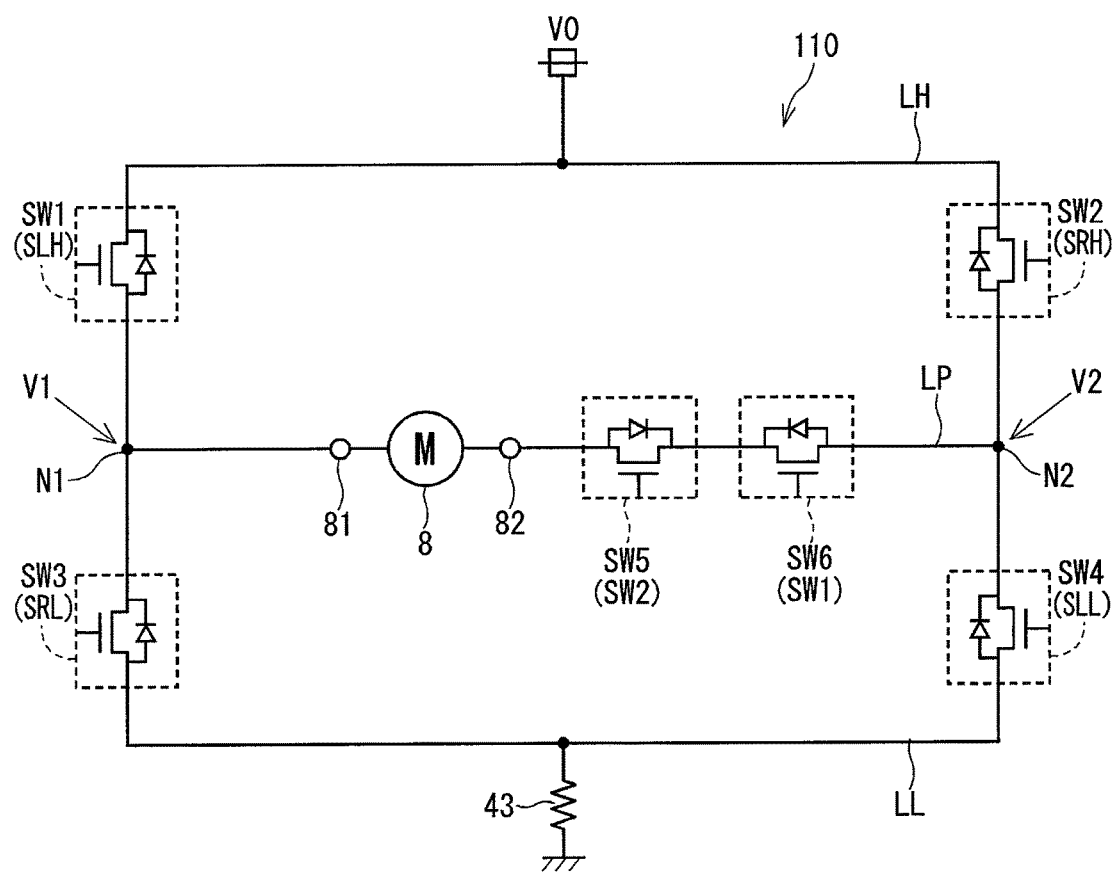
FIG. 11 is a diagram that shows a current feeding circuit for a motor control apparatus according to a second prior art.

The operation of the motor control apparatus 100 is described in comparison with the prior art according to the current feeding circuits illustrated in FIGS. 2, 10 and 11.

FIG. 2 is a diagram shows the circuit equivalent to the one in FIG. 1 with the simplification of the circuit part having the H-bridge circuit 30 and the current feeding line LP.

For the comparison, FIG. 10 shows the current feeding circuit in the motor control apparatus 109 as the first prior art disclosed in Japanese Unexamined Patent Application Publication No. 2008-49780. For each of the switches SW1 to SW6 illustrated in FIG. 10, the reference numerals written in the publication are used with brackets. It is noted that the resistors corresponding to the pull-up resistor 41 and the pull-down resistor 42 are illustrated in the publication; however, the specification does not describe anything with regard to the resistors.

With regard to the configuration illustrated in FIG. 10, as illustrated by a broken-line arrow, the regenerative current Irg flows to the high potential line LH through the pull-down resistor 42, the motor 8 and the pull-up resistor 41. Accordingly, the voltage after the power source relay 20, which is used as the control voltage VC, rises, and hence causes an error operation or damage to the control circuit.

In contrast, as shown in FIG. 2, in the motor control apparatus 101 according to the first embodiment in the present disclosure, the regenerative current Irg from the low potential line LL is blocked by the lower-side protective diode 52 connected to the pull-down resistor 42. Additionally, when it is assumed, for example, that the motor terminals 81, 82 and the motor winding wires causes a ground fault, the regenerative current Irg is blocked by the upper-side protective diode 51 connected to the pull-up resistor 41. Therefore, it is prevented that the regenerative current Irg flows to the high potential line LH and the voltage at the high potential line LH rises. Accordingly, with regard to the configuration in which the voltage at the high potential line LH is sued as the control voltage Vc of the control circuit, it is prevented that the control circuit has an error operation and gets damage.

FIG. 11 shows the current feeding circuit in the motor control apparatus 110 according to the second prior art illustrated in FIG. 2 of the Patent Document 1. For each of the switches SW1 to SW6 illustrated in FIG. 11, the reference numerals written in the Patent Document 1 are used with brackets.

With regard to the configuration illustrated in FIG. 11, the resistors corresponding to the pull-up resistor 41 and the pull-down resistor 42 do not exist; therefore, the regenerative current Irg flowing to the high-potential line LH does not likely occur.

Based on the other points of view, the difference between the prior art in the Patent Document 1 and the present disclosure is discussed in the flowing. With regard to the reference numerals for each of the switches, the reference numbers in the present embodiment are used.

FIGS. 8A and 8B in the Patent Document 1 illustrate an initial fault diagnosis sequence to be executed after the ignition power source is turned on. With regard to this initial fault diagnosis, when a short-circuit fault in the current feeding line switches SW5, SW6 is diagnosed, the detection voltage is determined as turning on the upper arm switches SW1 and SW2 one by one for each of the two current feeding line switches SW5 and SW6. With regard to this fault diagnosis, when the lower arm switch SW3 or SW4, which constitutes a pair, has a short-circuit fault, the high potential line and the low potential line are connected in a short circuit and an overcurrent flows through the both of the high potential line and the low potential line. Hence, the switches may get damage.

The initial fault diagnostic sequence needs to wait until the voltage gets stable after each of the switches is turned on or off at the time of determining a detection voltage. With regard to the prior art in the Patent Document 1, with only the short-circuit fault diagnosis for the current feeding line switches SW5 and SW6, it is needed to determine the detection voltage for each of the current feeding line switches SW5, SW6 one by one, in other words, determines the detection voltage twice. Therefore, it takes longer time for the fault diagnosis.

In contrast to the prior art in the Patent Document 1, the second feature of the motor control apparatus 100 in the present disclosure is to prevent the overcurrent from flowing into the bridge circuit when having a short-circuit fault diagnosis for the current feeding line switches SW5, SW6. With regard to the configuration for achieving this feature, the pull-up resistor 41 is connected between the high potential line LH and the third node N3. Therefore, a voltage is applied to the third node N3 through the pull-up resistor 41 from the high potential line LH. Accordingly, the short circuit fault in the current feeding line switches SW5, SW6 is diagnosed without turning on the upper arm switches SW1 and SW2.

In addition, the pull-up resistor 41 is connected between the high potential line LH and the third node N3; and the pull-down resistor 42 is connected between the fourth node N4 and the low potential line LL. With this configuration, multiple fault diagnosis can be carried out by the detection voltage determination with the switch operation once.

The following describes the working effect of the initial fault diagnostic sequence in detail with regard to the present disclosure.

The initial fault diagnostic sequence carried out by the fault diagnostic device 60 is described with reference to the current feeding circuits in FIGS. 3 and 4 and the flowcharts in FIGS. 5 and 6. FIG. 6 is a sub-flowchart that indicates the detail of step S10 in FIG. 5.

In the following description, the description "a fault in a switch A or a switch B" indicates that: only the switch A has a fault; only the switch B has a fault; or both of the switches A and B have a fault. Additionally, the wording "or" in FIGS. 5 and 6 may be interpreted in a same manner.

Figure 5:
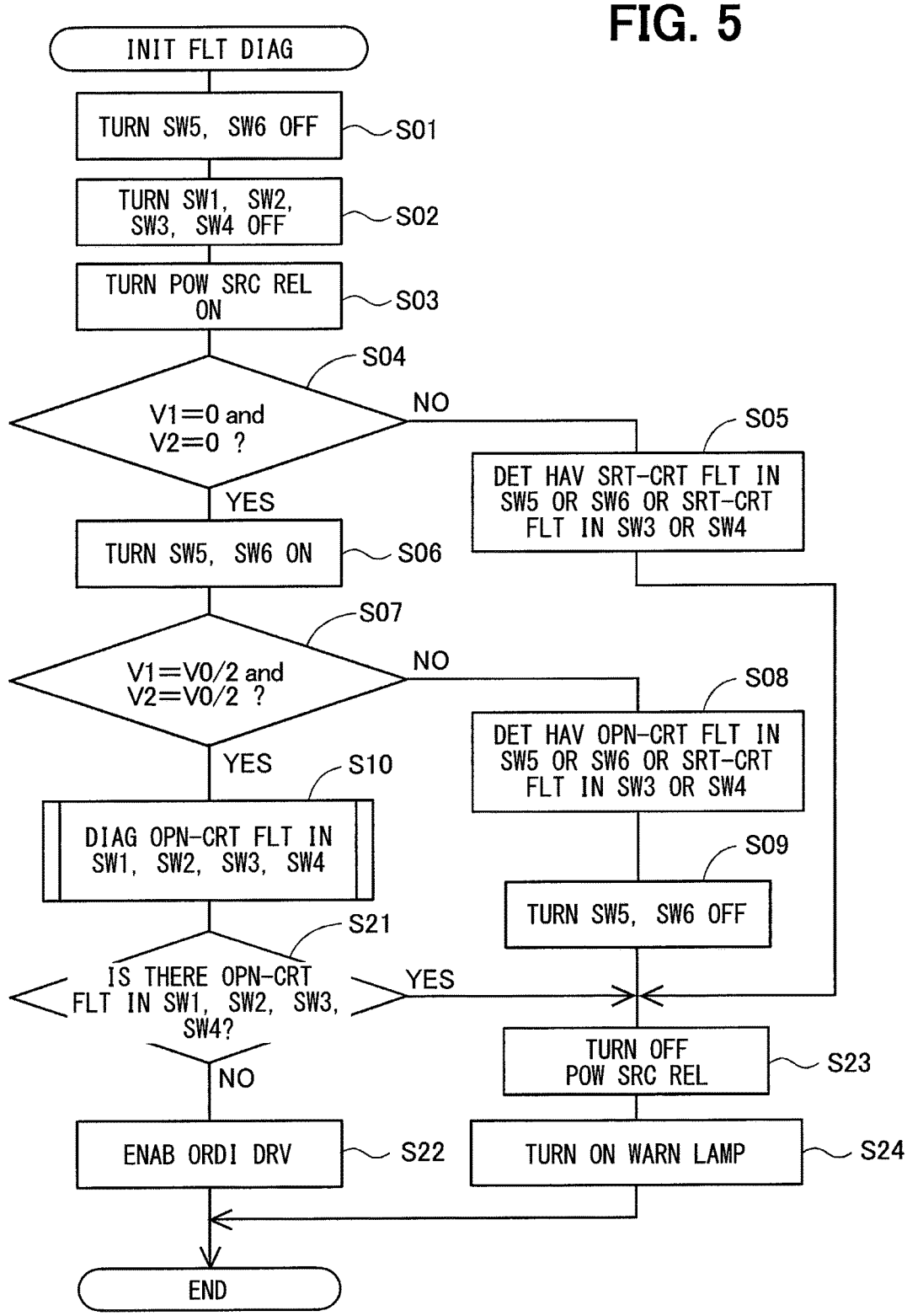
FIG. 5 is a main flowchart that illustrates initial fault diagnosis according to the first embodiment in the present disclosure.
Figure 6:
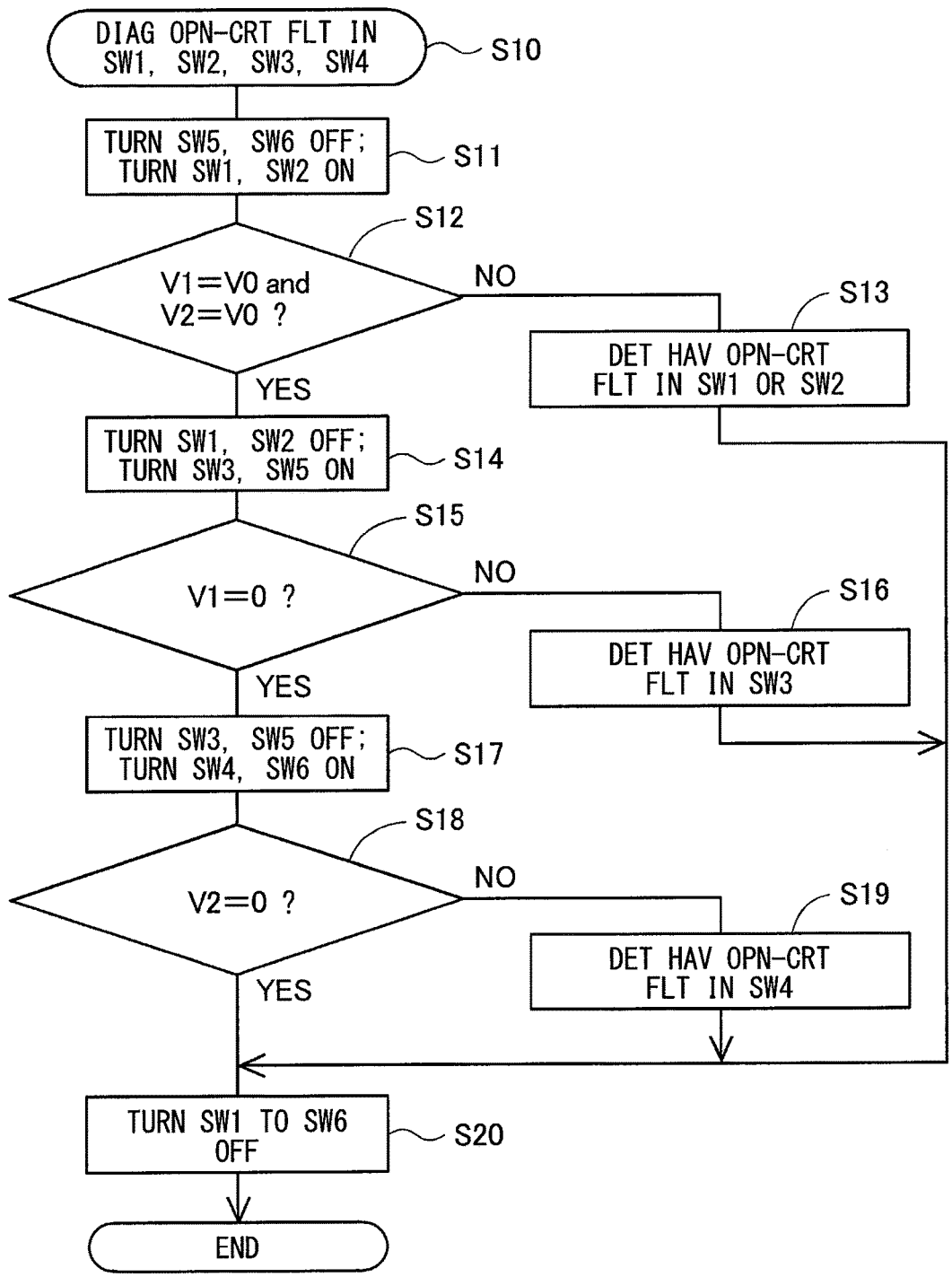
FIG. 6 is a sub-flowchart that illustrates open-circuit fault diagnosis for switches in a bridge circuit.

As shown in FIG. 5, in the initial fault diagnosis, the two current feeding line switches SW5, SW6 and the four bridge circuit switches SW1, SW2, SW3, SW4 are all turned off in steps S01, S02. Subsequently, the power source voltage VO is applied to the third node N3 through the pull-up resistor 41 when the power source relay 20 is turned on in step S03. The potential at the third node N3, which is obtained by subtracting the voltage drop through the pull-up resistor 41 from the power source voltage VO, is designated as the third voltage V3.

In this situation, when neither of the current feeding line switches SW5 and SW6 nor the upper arm switches SW1 and SW2 have a short-circuit fault, in other words, when the switches operate normally or have an open-circuit fault, the current does not flow from the high potential line LH to the first node N1 and the second node N2. Accordingly, the first voltage V1 and the second voltage V2 become zero (i.e., step S04: YES).

On the other hands, when the first voltage V1 and the second voltage V2 do not become zero (i.e., step S04: NO), it is determined that i) the current feeding line switch SW5 or SW6 has a short-circuit fault; or ii) the upper arm switch SW1 or SW2 has a short-circuit fault in step S05.

In the following description, it is assumed that the resistance values of the motor 8, the each wiring, and the part between drain and source at the time of turning on the switch are zero. In addition, the resistance values of the pull-up resistor 41 and the pull-down resistor 42 are non-zero values, and are identical values.

Figure 3:
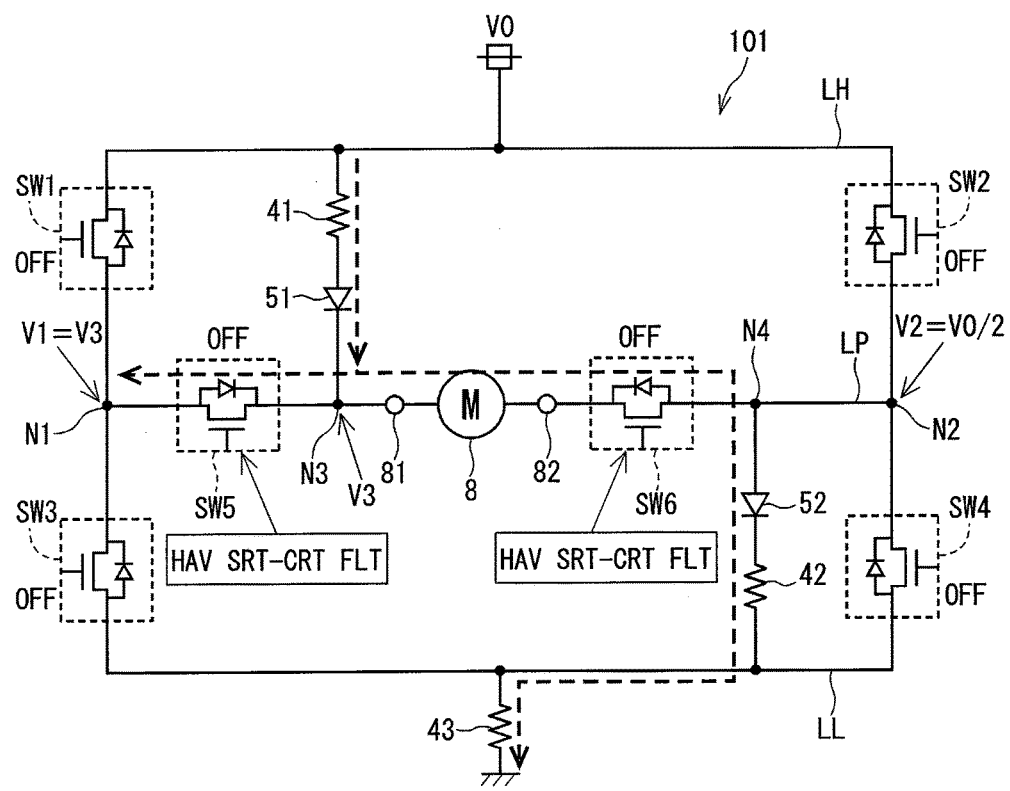
FIG. 3 is a diagram that shows the working of current feeding line switches when having a short-circuit fault.

As shown in FIG. 3, when the current feeding line switch SW5 has a short-circuit fault, the first voltage V1 becomes equal to the third voltage V3, which is greater than zero. In addition, when the current feeding line switch SW6 has a short-circuit fault, the potentials at the second node N2, the third node N3 and the fourth node N4 become equal to an half of the power source voltage (i.e., VO/2). Accordingly, the second voltage V2 becomes equal to an half of the power source voltage VO.

Even though it is not illustrated, when the upper arm switch SW1 has a short-circuit fault, the first voltage V1 becomes equal to the power source voltage VO; and when the upper arm switch SW2 has a short-circuit fault, the second voltage V2 becomes equal to the power source voltage VO.

When the first voltage V1 and the second voltage V2 are equal to a half of the power source voltage VO (i.e., S04: YES), both of the current feeding line switches SW5 and SW6 are once turned on while four of the bridge circuit switches SW1, SW2, SW2 and SW4 remain being off in step S06.

In this situation, when i) neither the current feeding line switch SW5 nor SW6 has an open-circuit fault; and ii) neither the lower arm switch SW3 nor SW4 has a short-circuit fault, all of the potentials at the first node N1, the second node N2, the third node N3 and the fourth node N4 become equal to a half of the power source voltage VO. Accordingly, the first voltage V1 and the second voltage V2 become equal to a half of the power source voltage VO (i.e., step S07: YES).

On the other hands, when the first voltage V1 and the second voltage V2 are not equal to a half of the power source voltage VO (i.e., step S07: NO), it is determined that i) the current feeding line switch SW5 or SW6 has an open-circuit fault; or ii) the lower arm switches SW3 or SW4 has a short-circuit fault in step S08. Subsequently, the current feeding line switches SW5 and SW6 are turned off in step S09.

Figure 4:
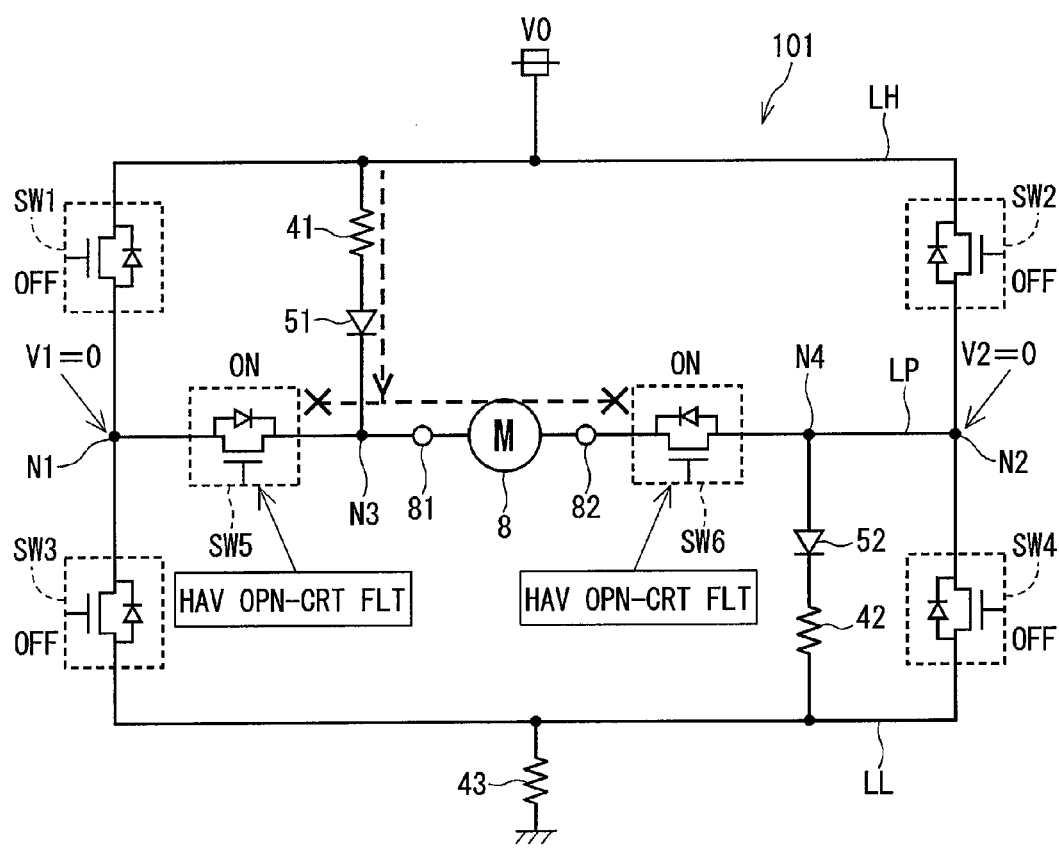
FIG. 4 is a diagram that shows the working of the current feeding line switches when having an open-circuit fault.

As shown in FIG. 4, when the current feeding line switch SW5 has an open-circuit fault, the first voltage V1 becomes equal to zero. Similarly, when the current feeding line switch SW6 has an open-circuit fault, the second voltage V2 becomes equal to zero.

Although it is not illustrated, when the lower arm switches SW3 or SW4 has a short-circuit fault, the first voltage V1 and the second voltage V2 become equal to zero. When the upper arm switch SW1 or SW2 has a short-circuit fault, it is determined that the first voltage V1 and the second voltage V2 are not equal to zero (i.e., NO in step S04) so that step S07 is not executed. Accordingly, it is prevented that an overcurrent flows through upper and lower arm switches in the first half-bridge circuit 31 or the second half-bridge circuit 32.

When the first voltage V1 and the second voltage V2 are equal to a half of the power source voltage VO (i.e., YES in step S07), the process is shifted to step S10, and then the open-circuit faults in the bridge circuit switches SW1m SW2, SW3, SW4 are diagnosed. It is determined that i) the current feeding line switches SW5 and SW6 operate normally; and ii) neither the bridge-circuit switches SW1, SW2, SW3 nor SW4 has a short-circuit fault.

With regard to the open-circuit fault diagnosis for the bridge circuit switches SW1, SW2, SW3, SW4 illustrated in FIG. 6, the current feeding line switches SW5, SW6 are turned off, and the upper arm switches SW1, SW2 are turned on once in step S11.

In this situation, when neither the upper arm switch SW1 nor SW2 has an open-circuit fault, the first voltage V1 and the second voltage V2 becomes equal to the power source voltage VO (i.e., S12: YES). On the other hands, when the first voltage V1 and the second voltage V2 are not equal to the power source voltage VO (i.e., S12: NO), it is determined that the upper arm switch SW1 or SW2 has an open-circuit fault in step S13.

Next, the upper arm switches SW1, SW2 are turned off, and the lower arm switch SW3 and the current feeding line switch SW5 are turned on in step S14. When the lower arm switch SW3 does not have an open-circuit fault, the first voltage V1 becomes equal to zero (i.e., S15: YES). On the other hands, when the first voltage V1 does not become equal to zero (i.e., S15: NO), it is determined that the lower arm switch SW3 has an open-circuit fault in step S16.

Subsequently, the lower arm switch SW3 and current feeding line switch SW5 are turned off, and the lower arm switch SW4 and the current feeding line switch SW6 are turned on in step S17. When the lower arm switch SW4 dies bit gave an open-circuit fault, the second voltage V2 becomes equal to zero (i.e., S18: YES). On the other hands, when the second voltage is not equal to zero (i.e., S18: NO), it is determined that the lower arm switch SW4 has an open-circuit fault in step S19.

When the second voltage V2 is equal to zero (i.e., YES in step S18), it is determined that all of the bridge circuit switches SW1, SW2, SW3, SW4 do not have an open-circuit fault; and all of the switches SW1 to SW6 work normally.

When i) the second voltage V2 is equal to zero; and ii) it is determined that any one of the bridge circuit switches has an open-circuit fault in step S13, step S16, or step S19, with regard to the switches SW1 to SW6, the switch in an on state is turned off in step S20. Then, the open-circuit fault diagnosis in step S10 for the bridge circuit switches SW1, SW2, SW3, SW4 is terminated.

Referring back to FIG. 5, when all of the switches SW1 to SW6 work normally, in other words, when there are no open-circuit faults in the bridge circuit switches SW1, SW2, SW3, SW4 (i.e., S21: NO), the process is shifted to step S22, and then the ordinary driving of the motor 8 is enabled.

On the other hands, when having steps S13, S16 and S19, which is to be determined as NO prior to steps S05, S08 and YES in step S21, the power source relay 20 is turned off in step S23, and a warning lamp is turned on in step S24 so as to notify the driver of an abnormal situation. The driver who confirms the result of the warning lamp may, for example, go to a car dealer for repairing or exchanging the motor control apparatus 101.

With regard to the above-mentioned initial fault diagnosis, in the short-circuit fault diagnosis for the current feeding line switches SW5, SW6 executed initially, it is not needed to turn on the upper arm switches SW1, SW2. Accordingly, even when the lower arm switches, which constitute a pair, have a short-circuit fault, it is prevented that an overcurrent flows into the bridge circuit. Thus, the damage to the switches is prevented.

In addition, a multiple fault diagnosis is performed by determining the detection voltage with the switch operation only once. Therefore, the time required for the fault diagnosis is shortened.

Second Embodiment, Third Embodiment, Fourth Embodiment

A second embodiment, a third embodiment and a fourth embodiment in the present disclosure are respectively described with reference to FIG. 7, FIG. 8 and FIG. 9, which correspond to FIG. 2 in the first embodiment. These embodiments are different from the first embodiment in terms of the availability of the protective diode 52 at the pull-down resistor 42 side or the configuration of the current feeding circuit related to the arrangement of the current feeding line switch SW6 or the motor 8 on the current feeding line LP. As described hereinafter, in any of these embodiments, the regenerative current Irg flowing to the high potential line LH is enabled to be blocked even in a case where the motor terminals 81 and 82 have a ground fault.

Figure 7:
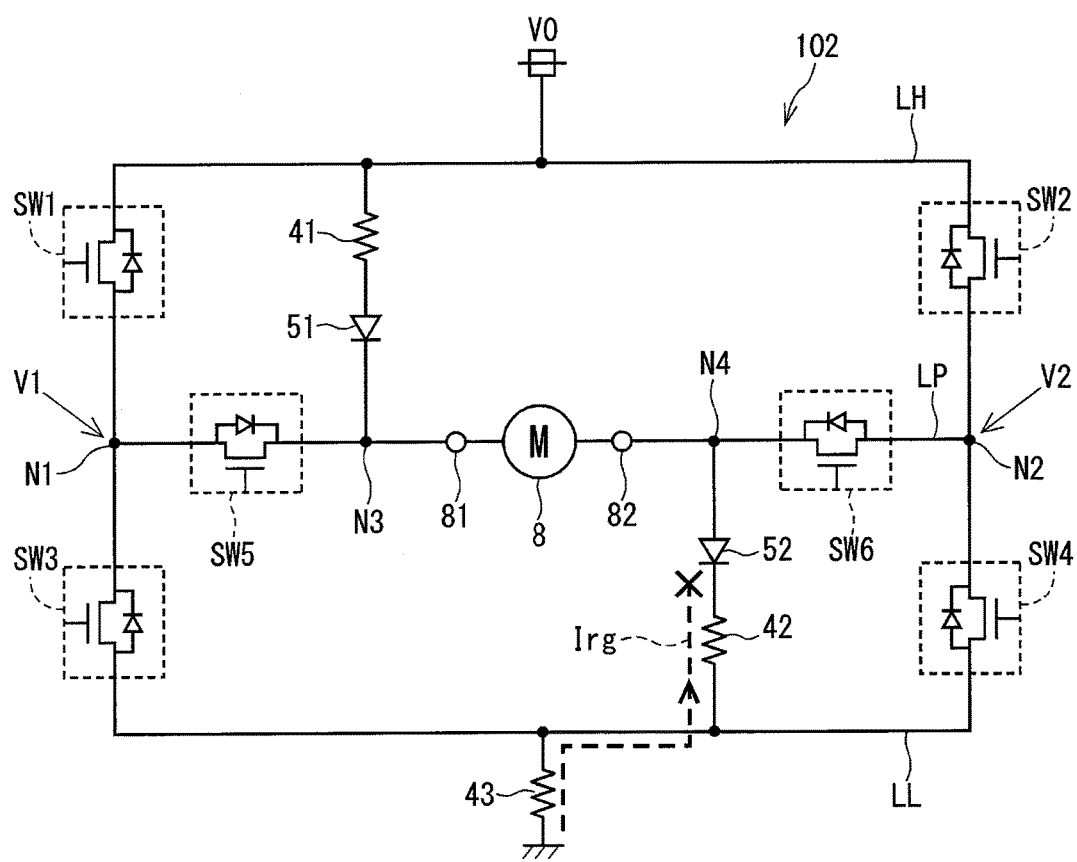
FIG. 7 is a diagram that shows a current feeding circuit for a motor control apparatus according to a second embodiment in the present disclosure.

In contrast to the first embodiment, in a motor control apparatus 102 according to the second embodiment illustrated in FIG. 7, the fourth node N4 connected to the pull-down resistor 42 is arranged between the motor 8 and the current feeding line switch SW6. Even when the arrangement of the pull-down resistor 42 is changed, the regenerative current Irg is blocked by the lower side protective diode 52 similarly to the first embodiment.

Figure 8:
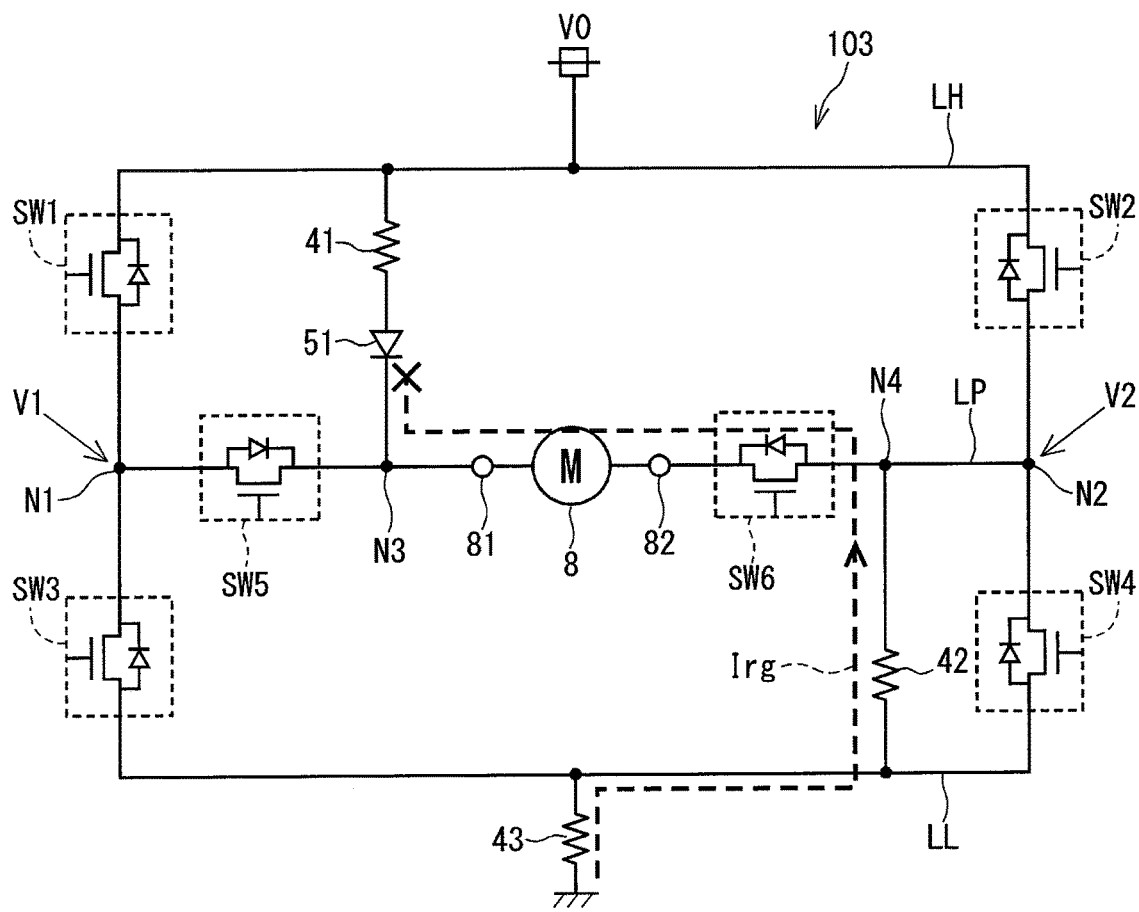
FIG. 8 is a diagram that shows a current feeding circuit for a motor control apparatus according to a third embodiment in the present disclosure.

In contrast to the first embodiment, in a motor control apparatus 103 according to the third embodiment illustrated in FIG. 8, only the upper side protective diode 51 is connected to the pull-up resistor 41 without having the lower side protective diode 52. In the third embodiment, although the regenerative current Irg is directed to the current feeding line LP, the regenerative current Irg is blocked by the upper side protective diode 51; therefore, the regenerative current Irg is prevented from flowing into the high potential line LH. In addition, the regenerative current Irg, which is generated in a case where the motor terminals 81, 82 have a ground fault, is also blocked by the upper side protective diode 51.

Figure 9:
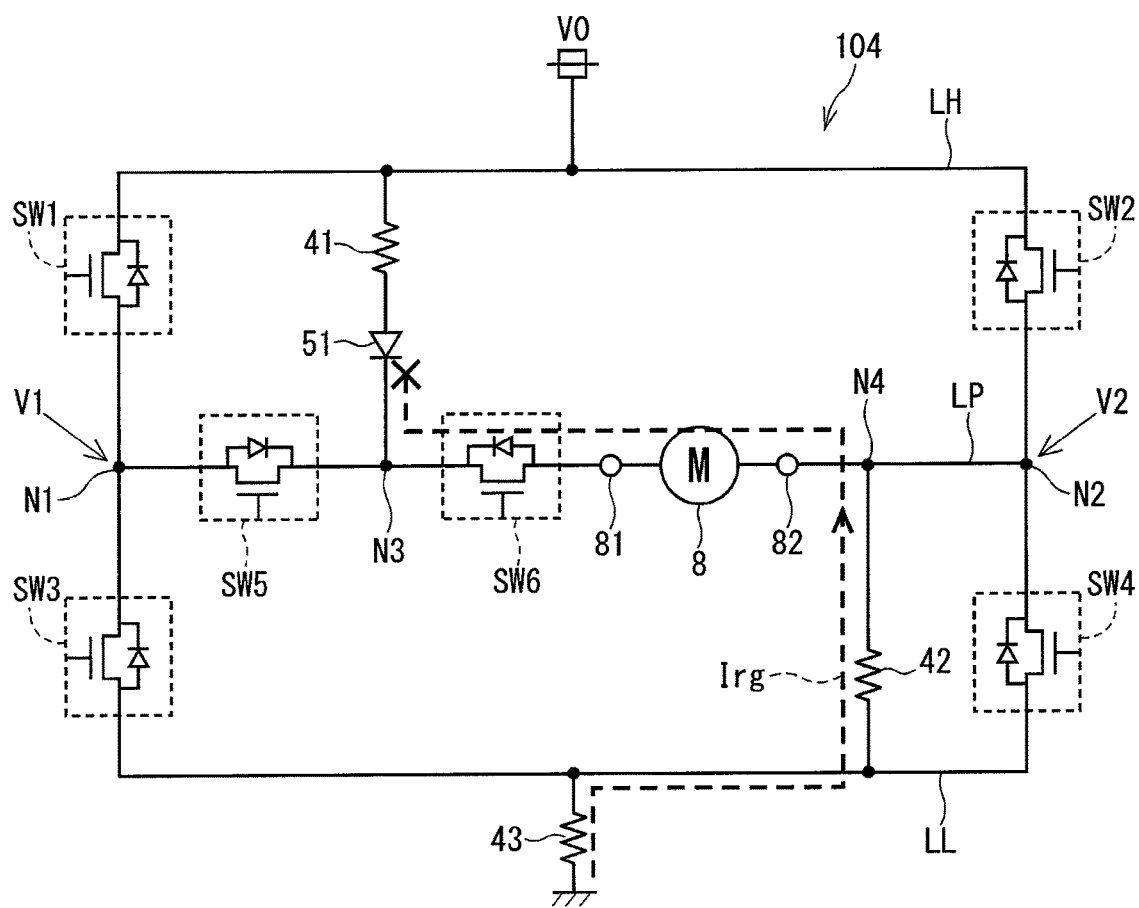
FIG. 9 is a diagram that shows a current feeding circuit for a motor control apparatus according to a fourth embodiment in the present disclosure.

In contrast to the third embodiment, in a motor control apparatus 104 according to the fourth embodiment illustrated in FIG. 9, the current feeding line switch SW6 is arranged between the third node N3 and the motor 8. In other words, the motor 8 is not held between two current feeding line switches SW5, SW6. As similar to the third embodiment, in the fourth embodiment, the regenerative current Irg is blocked by the upper side protective diode 51 also in a case where the motor terminals 81, 82 have a ground fault.

Moreover, the second embodiment, the third embodiment and the fourth embodiment may also adopt the initial fault diagnostic sequence in the first embodiment illustrated in FIGS. 5 and 6. In other words, it is not needed to turn on the upper arm switches SW1, SW2 in the short-circuit fault diagnosis for the current feeding line switches SW5, SW6. Accordingly, even when the lower arm switches, which constitute a pair, has a short-circuit fault, an overcurrent is prevented from flowing into the bridge circuit so that the damage to the switches is prevented.

In addition, a multiple fault diagnosis is performed by determining the detection voltage with the switch operation only once. Therefore, the time required for the fault diagnosis is shortened.

Other Embodiments

A) With regard to four bridge-circuit switches SW1, SW2, SW3, SW4 and two current feeding line switches SW5, SW6, an field-effect transistor other than MOSFET or a transistor such as IGBT may be used. In a case of using a transistor without a parasitic diode in itself, a reflux diode connected in parallel with a part between collector and emitter may be regarded as the parasitic diode.

B) For example, in replacement of one of the current feeding line switches SW5 and SW6, a parasitic diode may be used to redundantly connect in parallel or in series with a plurality of switches in the same direction. With regard to the belonging determination in the technical scope of the present disclosure, a group of the plurality of switches connected redundantly may be interpreted as one switch for achieving the identical function.

C) With regard to the first, second, third and fourth embodiments, at least the upper-side protective diode 51 is connected to the pull-up resistor 41, and the regenerative current Irg flowing to the high potential line LH is blocked in a case where, for example, the motor terminals 81, 82 have a ground fault. However, in a case where there is an extremely low possibility in having a ground fault in the motor terminals 81, 82, the lower side protective diode 52 may be provided to the pull-down resistor 42 only.

D) The initial fault diagnosis in the above embodiments sets a priority for diagnosing even only one of the four bridge-circuit switches and the two current feeding line switches having a fault that is carried out with the minimum occurrence of determination. Therefore, the initial fault diagnosis in the above embodiments does not emphasize on specifying which switch is having a fault or specifying the fault type such as a short-circuit fault or an open-circuit fault. For the motor 8 applied to an apparatus such as an electric power steering apparatus, in view of the safety, when any one of switches is diagnosed to have a fault, the ordinary driving of the motor 8 is not enabled. Therefore, the repair or exchange of the entire motor is needed.

However, the motor control apparatus in the present disclosure is not only applied to the electric power steering apparatus, but may also be applied to a motor which is used for other purposes. In accordance with the using purpose of the motor 8, for example, in a case where the rotation in a counter-clockwise direction is not allowable while the rotation in a clockwise direction is allowable; or a process is taken for forcibly inhibiting the rotation of the motor caused by external force, it is presumed that limited driving of the motor in response to a switch having a fault or a fault type may be enabled. In such examples, there is technical significance in specifying a switch having a fault or a fault type even when, for example, the occurrence of determination is increased. Thus, the fault diagnostic sequence may be changed in response to the requirement for controlling the motor.

It is noted that a flowchart or the processing of the flowchart in the present application includes sections (also referred to as steps), each of which is represented, for instance, as S01. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus controlling current feeding to a motor and a rotational direction of the motor by operating a switch in an H-bridge circuit, comprising:
    four bridge-circuit switches that are arranged between a high potential line and a low potential line, and constitute the H-bridge circuit in which a first half-bridge circuit and a second half-bridge circuit are connected in parallel;
    two current feeding line switches that are arranged at a current feeding line connected through the motor between a first node as an intermediate point of the first half-bridge circuit and a second node as an intermediate point of the second half-bridge circuit, and are connected in series so as to arrange two parasitic diodes facing each other in the two current feeding line switches;
    a pull-up resistor that is connected between the high potential line and a third node, which is arranged between the two current feeding line switches on the current feeding line;
    a pull-down resistor that is connected between the low potential line and a fourth node, which is arranged at an opposite side of the third node such that the motor is interposed between the third node and the fourth node on the current feeding line;
    a protective diode that is connected to at least one of the pull-up resistor and the pull-down resistor, and blocks a current flowing from a low potential side to a high potential side; and
    a fault diagnostic device that includes:
        a driving circuit that turns on or off the four bridge-circuit switches and the two current feeding line switches; and
        a voltage determinator that determines suitability of a first voltage at the first node and a second voltage at the second node,
    wherein the fault diagnostic device carries out initial fault diagnosis for at least one of the four bridge circuit switches and the two current feeding line switches based on the first voltage and the second voltage before driving of the motor.

2. The motor control apparatus according to claim 1, wherein the fault diagnostic device diagnoses a short-circuit fault in at least one of the two current feeding line switches and the short-circuit fault in at least one of two upper arm bridge-circuit switches in the H-bridge circuit based on the first voltage and the second voltage at once, when all of the four bridge-circuit switches and the two current feeding line switches are turned off.

3. The motor control apparatus according to claim 2, wherein the fault diagnostic device turns on or off the four bridge-circuit switches and the two current feeding line switches, and sequentially diagnoses an open-circuit fault in the four bridge-circuit switches based on the first voltage and the second voltage.

4. The motor control apparatus according to claim 1, wherein the fault diagnostic device diagnoses an open-circuit fault in at least one of the two current feeding line switches and a short-circuit fault in at least one of two lower arm bridge circuit switches in the H-bridge circuit based on the first voltage and the second voltage at once, when all of the four bridge circuit switches are turned off and all of the two current feeding line switches are turned on.

5. The motor control apparatus according to claim 1, wherein the protective diode is connected to at least the pull-up resistor.

6. The motor control apparatus according to claim 1, wherein the suitability of the first voltage at the first node and the second voltage at the second node includes a situation in which the determinator determines whether the first voltage and the second voltage are equal to a predetermined voltage value.

* * * * *